Dec. 29, 1964    KENICHI ZENYOJI ETAL    3,163,097
EXPOSURE METERING DEVICE BUILT INTO
SINGLE LENS REFLEX CAMERA
Filed Dec. 12, 1961
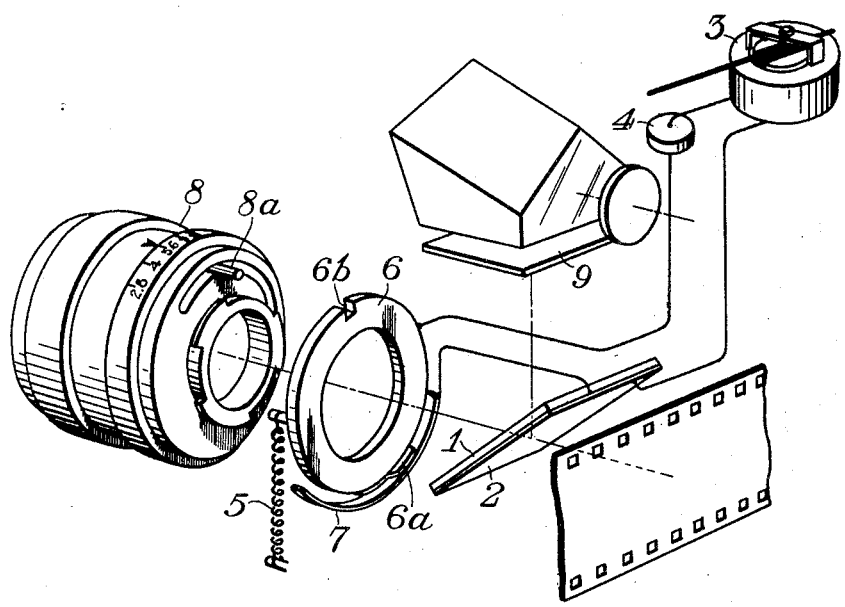
Inventors:
Kenichi Zenyoji
Koro Ursumi
Suminosuke Kawase
by: Michael S. Striker
Attorney

United States Patent Office 3,163,097
Patented Dec. 29, 1964

3,163,097
EXPOSURE METERING DEVICE BUILT INTO SINGLE LENS REFLEX CAMERA
Kenichi Zenyoji, Kozo Utsumi, and Suminosuke Kawase, all of Tokyo, Japan, assignors to Tokyo Kogaku Kikai Kabushiki-Kaisha, Tokyo, Japan, a corporation of Japan
Filed Dec. 12, 1961, Ser. No. 158,688
Claims priority, application Japan, Dec. 15, 1960, 35/49,398
5 Claims. (Cl. 95—10)

This invention relates to an exposure metering device built into a single lens reflex camera, having a photocell layer fitted on the back of a movable semi-transparent mirror and a built-in galvanometer connected to said photocell layer.

When measuring the brightness of the subject with an electric exposure meter prior to taking the picture, it is most practical if the effective pencil of light that is transmitted through the taking lens and reaches the effective film plane strikes the light sensitive element of the exposure meter, that is, the photoconductor, such as cadmium sulphide type.

However, since the angle of field of the effective pencil of light changes in obedience to the focal length of the taking lens, the placement of the photoconductor at the position of the movable reflecting mirror can be considered as appropriate for the single lens reflex camera which can easily use interchangeable lenses of different focal length.

It is an object of the invention to provide an improved device in which a photocell layer is fitted on the back of a movable semi-transparent mirror, and thereby permitting measurement of the light intensity without obstructing the viewing of the subject image on the focusing ground glass, which has been designed on the basis of the above-mentioned requirement, and which is simple and practical in construction and is accurate and reliable in operation.

It is another object of the invention to provide an improved device interconnecting the exposure meter and the lens diaphragm adjusting mechanism, which has been designed on the basis of the above-mentioned requirement, and which is simple and practical in construction and is accurate and reliable in operation.

According to this invention, the device comprises a photocell layer fitted on the back of a movable semi-transparent mirror disposed on the optical axis of the taking lens and a built-in galvanometer connected to the electric circuit comprising said photocell layer.

According to this invention, a glass member of said semi-transparent mirror is a filter preventing passage of long wave length light.

According to this invention, the device comprises a ring capable of revolving about said optical axis of the taking lens and tending to revolve back to the predetermined position, a variable resistor fixed on the camera body, which is connected to said electric circuit and controlled with said ring, and a diaphragm regulating ring detachably engaged with said ring.

In the above construction, the supporting member, i.e., glass, of the semi-transparent mirror, is simultaneously also the supporting member for the photocell, in order to reduce the weight of said mirror.

Referring now to the drawing, there is illustrated a perspective view of one form of the invention.

In the figure, the reference numeral 1 designates a semi-transparent mirror movably supported in the camera body (not shown), and the reference numeral 2 represents a light sensitive element such as photo-conductive material cadmium sulphide, fitted on the back of said semi-transparent mirror and connected with a galvanometer 3 and the battery 4. Because there are numerous photo-conductive cells with high-sensitivity and small size excellent batteries, photoconductors, working on battery power, are utilized more often for electric exposure meters in cameras.

However, it should be noted that photographic sensitive material (films) are quite sensitive to short wave length light but not so to long wave length light, while photoconductors are rather sensitive to long wave length light and that, therefore, there will be errors if the result obtained on the photoconductors are used "as is" as the basis for exposure in picture taking.

Therefore, in the present invention, it is proposed that a filter for the long wave length light be laid over the light sensitive element when photo-conductive material is utilized as the photocell. For this purpose, it is practical if the supporting member of the photo-conductive cell, i.e., the glass plate of the semi-transparent mirror, is made of the filter material preventing passage of long wave length light.

In the next place, if the single lens reflex camera equipped with an exposure meter utilizing the semi-transparent mirror as the photoconductor is used with a taking lens having a preset diaphragm mechanism, i.e. a lens equipped with diaphragm mechanism giving wide-open aperture at all times but closing down to the predetermined aperture for the instant of the picture taking only, it will not only be troublesome to stop down the diaphragm blades to the predetermined aperture to measure the light intensity with the built-in exposure meter (before shooting the picture) but there will be an added shortcoming in that the focusing ground glass (used for viewing the image) will also become dark.

Therefore, in this invention, a ring 6, which can only revolve in one direction around the optical axis of the picture-taking lens, due to the retaining action of a spring 5, and a variable resistor 7, arranged co-axial with said ring, are attached to the camera body. Said resistor is fixed to the camera body, while a brush 6a, attached to said ring 6, brushes the surface of the resistor 7 as it revolves with the ring, bringing about changes in the effective value of resistance of the resistor and, at the same time, connects the variable resistor into the series circuit of said electric exposure meter. Furthermore, the preset diaphragm ring 8, equipped on the taking lens barrel, and the pin 8a, extending from the camera body, interconnects when the taking lens attached to the camera body by its bayonet mount and the ring 8 engages with the notch 6b on said ring 6 so that the rings 8 and 6 move together about the optical axis of the taking lens.

Revolving the preset diaphragm ring 8 does not directly stop down the diaphragm blades but as the aperture scale is turned in the direction of the smaller apertures in relation to the fixed aperture index, the ring 6 also revolves at the same time and has the effect of increasing the effective value of resistance of the variable resistor 7. The strength of spring 5, working the ring 6, need not be large and while it cannot override the frictional resistance of the click-stop, occuring when the present diaphragm ring 8 is set to the predetermined aperture, the ring 6, activated by spring 5, will revolve back to a predetermined position when the taking lens is detached from the camera body and, at this time, the effective value of resistance of the variable resistors will be zero or the minimum value.

In this invention, the correct exposure for the predetermined aperture opening will be accurately indicated by the needle of the exposure meter, without any darkening of the subject image on the focusing ground glass 9, simply by setting the preset diaphragm ring, of the taking lens attached to the single lens reflex camera body, to the predetermined aperture. In this case, the exposure reading is extremely accurate because the actual pencil of light utilized for the picture taking is measured.

Furthermore, when taking lens not equipped with the preset diaphragm ring or when extension tubes are used, it will still be possible to measure the exposure time with the said exposure meter by simply stopping down the diaphragm blades, of the lens being used, to the required aperture opening because the ring 6, on the camera body side, has revolved back to produce an effective value of resistance of the variable resistor 7 of zero or minimum value. Furthermore, if found necessary, it will be possible to measure the change in swing of the galvanometer needle and, through the coupling mechanisms of the shutter release button, produce correct exposure by automatically controlling the exposure time adjustment device of the shutter.

While the invention has been described in conjunction with a preferred embodiment thereof, it is to be understood that various changes and modification may be made without departing from the spirit and scope of the invention.

What we claim is:

1. In a single lens reflex camera, in combination, viewfinder means; an objective; flat, semi-transparent reflector means positioned behind said objective and directing light rays passing therethrough to said viewfinder means to provide in the viewfinder an image of the subject which is to be photographed, said reflector means having a front face directed toward the objective and viewfinder means and a rear face directed toward the focal plane to the rear of said reflector means; a layer of photo-conductive material carried by and covering the rear face of said reflector means so that light passing through the reflector means influences the resistance of said layer; an electrical circuit in which said layer is connected; a battery and meter connected in said circuit, so that while the subject is viewed in the viewfinder means the light passing through the objective is measured; a variable resistor located in said circuit; and preselecting means for preselecting a diaphragm setting, said preselecting means being operatively connected to said variable resistor for adjusting the latter according to the selected diaphragm aperture, whereby the meter will indicate the correct exposure for the selected diaphragm aperture without a closing of the aperture to this selected aperture opening.

2. In a single lens reflex camera, in combination, viewfinder means; an objective; flat, semi-transparent reflector means positioned behind said objective and directing light rays passing therethrough to said viewfinder means to provide in the viewfinder an image of the subject which is to be photographed, said reflector means having a front face directed toward the objective and viewfinder means and a rear face directed toward the focal plane to the rear of said reflector means; a layer of photo-conductive material carried by and covering the rear face of said reflector means so that light passing through the reflector means influences the resistance of said layer; an electrical circuit in which said layer is connected; a battery and meter connected in said circuit, so that while the subject is viewed in the viewfinder means the light passing through the objective is measured; a variable resistor located in said circuit; and preselecting means for preselecting a diaphragm setting, said preselecting means being operatively connected to said variable resistor for adjusting the latter according to the selected diaphragm aperture, said variable resistor including an arcuate resistor element extending along a circle whose center is in the optical axis of the objective and a rotary ring turnable about said optical axis and carrying a brush which moves along said resistor during turning of said ring, said preselecting means including a rotary member connected to said ring for turning the same, whereby the meter will indicate the correct exposure for the selected diaphragm aperture without a closing of the aperture to this selected aperture opening.

3. In a single lens reflex camera, in combination, viewfinder means; an objective; flat, semi-transparent reflector means positioned behind said objective and directing light rays passing therethrough to said viewfinder means to provide in the viewfinder an image of the subject which is to be photographed, said reflector means having a front face directed toward the objective and viewfinder means and a rear face directed toward the focal plane to the rear of said reflector means; a layer of photo-conductive material carried by and covering the rear face of said reflector means so that light passing through the reflector means influences the resistance of said layer; an electrical circuit in which said layer is connected; a battery and meter connected in said circuit, so that while the subject is viewed in the viewfinder means the light passing through the objective is measured; a variable resistor located in said circuit; and preselecting means for preselecting a diaphragm setting, said preselecting means being operatively connected to said variable resistor for adjusting the latter according to the selected diaphragm aperture, said variable resistor including an arcuate resistor element extending along a circle whose center is in the optical axis of the objective and a rotary ring turnable about said optical axis and carrying a brush which moves along said resistor during turning of said ring, said preselecting means including a rotary member connected to said ring for turning the same, said rotary ring being formed with a cutout and said rotary member of said preselecting means carrying a pin which extends into said cutout for transmitting to said rotary ring turning movement of said rotary member of said preselecting means, whereby the meter will indicate the correct exposure for the selected diaphragm aperture without a closing of the aperture to this selected aperture opening.

4. In a single lens reflex camera, in combination, viewfinder means, an objective; flat, semi-transparent reflector means positioned behind said objective and directing light rays passing therethrough to said viewfinder means to provide in the viewfinder an image of the subject which is to be photographed, said reflector means having a front face directed toward the objective and viewfinder means and a rear face directed toward the focal plane to the rear of said reflector means; a layer of photo-conductive material carried by and covering the rear face of said reflector means so that light passing through the reflector means influences the resistance of said layer; an electrical circuit in which said layer is connected; a battery and meter connected in said circuit, so that while the subject is viewed in the viewfinder means the light passing through the objective is measured; a variable resistor located in said circuit; and preselecting means for preselecting a diaphragm setting, said preselecting means being operatively connected to said variable resistor for adjusting the latter according to the selected diaphragm aperture, said variable resistor including an arcuate resistor element extending along a circle whose center is in the optical axis of the objective and a rotary ring turnable about said optical axis and carrying a brush which moves along said resistor during turning of said ring, said preselecting means including a rotary member connected to said ring for turning the same, said rotary ring being formed with a cutout and said rotary member of said preselecting means carrying a pin which extends into said cutout for transmitting to said rotary ring turning movement of said rotary member of said preselecting means, said preselecting means being carried by the objective so that when one objective is exchanged for another the pin of the rotary member of the preselecting means of said other objective will extend into said cutout to operate said ring, whereby the meter will indicate the correct exposure for the selected diaphragm aperture without a closing of the aperture to this selected aperture opening.

5. In a single lens reflex camera, in combination, viewfinder means, an objective; flat, semi-transparent reflector means positioned behind said objective and directing light rays passing therethrough to said viewfinder means to provide in the viewfinder an image of the subject which is to be photographed, said reflector means having a front face directed toward the objective and viewfinder means and a rear face directed toward the focal plane to the rear of said reflector means; a layer of photoconductive material carried by and covering the rear face of said reflector means so that light passing through the reflector means influences the resistance of said layer; an electrical circuit in which said layer is connected; a battery and meter connected in said circuit, so that while the subject is viewed in the viewfinder means the light passing through the objective is measured; a variable resistor located in said circuit; preselecting means for preselecting a diaphragm setting, said preselecting means being operatively connected to said variable resistor for adjusting the latter according to the selected diaphragm aperture, said variable resistor including an arcuate resistor element extending along a circle whose center is in the optical axis of the objective and a rotary ring turnable about said optical axis and carrying a brush which moves along said resistor during turning of said ring, said preselecting means including a rotary member connected to said ring for turning the same, said rotary ring being formed with a cutout and said rotary member of said preselecting means carrying a pin which extends into said cutout for transmitting to said rotary ring turning movement of said rotary member of said preselecting means, said preselecting means being carried by the objective so that when one objective is exchanged for another the pin of the rotary member of the preselecting means of said other objective will extend into said cutout to operate said ring; and spring means operatively connected to said ring for returning the latter to a predetermined rest position when an objective is removed to displace the pin of the preselecting means out of said cutout, whereby the meter will indicate the correct exposure for the selected diaphragm aperture without a closing of the aperture to this selected aperture opening.

References Cited in the file of this patent

UNITED STATES PATENTS

| | | |
|---|---|---|
| 1,993,084 | Brewer | Mar. 5, 1935 |
| 2,285,761 | Tonnies | June 9, 1942 |
| 2,598,783 | Gittus | June 3, 1952 |
| 2,874,622 | Gebele | Feb. 24, 1959 |

FOREIGN PATENTS

| | | |
|---|---|---|
| 970,379 | Germany | Sept. 11, 1958 |
| 1,067,299 | Germany | Oct. 15, 1959 |